Patented Mar. 3, 1942

2,275,013

UNITED STATES PATENT OFFICE 2,275,013

AMIDES ACYLATED WITH ACYLATING AGENTS CONTAINING A WATER SOLUBILIZING GROUP

Charles Graenacher, Riehen, Franz Ackermann, Binningen, and Heinrich Bruengger, Basel, Switzerland, assignors to Society of Chemical Industry in Basle, Basel, Switzerland No Drawing. Original application November 8, 1937, Serial No. 173,528. Divided and this application November 7, 1939, Serial No. 303,323. In Switzerland November 11, 1936

5 Claims. (Cl. 260—205)

This application is a division of our application Serial No. 173,528 filed in U. S. A. on November 8, 1937, and in Switzerland on November 11, 1936, now Patent No. 2,235,480, issued March 18, 1941.

This invention relates to the manufacture of new condensation products by treating amides from primary amines and carboxylic acids which contain no hydroxyl groups, with an acylating agent containing besides the group which determines the acylation at least one substituent which lends, if desired after suitable conversion, to the new product solubility or increased solubility. The amides from primary amines and carboxylic acids may or may not have dyestuff character; further they may belong to various classes of compounds of the organic chemistry. Thus they may be aliphatic-aromatic, aliphatic-cyclo-aliphatic, aromatic-heterocyclic, heterocyclic-cyclo-aliphatic and the like.

Acylating agents which contain besides the acylating groups a substituent which enhances the solubility of the new condensation product, particularly in water, are for example halides or anhydrides of at least dibasic aliphatic, hydroaromatic or aromatic acids which contain sulfogroups or carboxyl groups or both, or halides or anhydrides of acids which contain alkylaminogroups besides the acid residues, so that after acylation the acyl residue still contains groups which can be converted into alkali metal compounds or quaternary ammonium compounds. The acylation is conducted in presence of a tertiary base, for instance pyridine. Acylating agents may therefore be used of which the non-acylating substituent enters into reaction with the tertiary base and thereby enhances the solubility of the parent material. As examples of the acylating agents defined in this paragraph there may be named halides of sulfo-carboxylic acids in which both the sulfo-group and the carboxyl group is in the form of a halide; also those in which only the sulfo-group or the carboxyl group is present in the form of halide such as the halide of sulfo-benzoic acids, of sulfo-naphtholic acids, of sulfoacetic acid or the like; also the 4-dialkylamino-1-benzoyl halides, the 4-halogenalkyl-1-benzoyl halides and the like (compare in this respect the statements in Patents No. 2,120,741 and No. 2,170,262).

The acylation process may be conducted for example by heating the parent material with the acylating agent in presence of a tertiary base. It is especially recommended, however, that the operation should be conducted in the presence of pyridine. Dimethylaniline may also be used.

By the process of condensation sparingly soluble to insoluble parent materials may be converted into products which are more easily soluble. These soluble or freely soluble compounds may then be used as such or be regenerated to the insoluble to sparingly soluble parent material by treatment with a saponifying agent, for instance dilute caustic alkali or dilute acid. The regenerated material may in this manner be fixed fast upon or in a substratum, for example on or in a fiber or an artificial mass. In this manner various effects such as matting or coloring may be produced.

When aliphatic bodies are selected for the condensation, for example an amide of a fatty acid of high molecular weight, such as stearic acid, and an aliphatic primary amine, for instance monoethylamine, there are obtained according to the choice of the acylating agent assistants having cation activity or anion activity. Products having a similar action are further obtained if aliphatic-aromatic or aliphatic-heterocyclic or aliphatic-cyclo-aliphatic products, such as the amides from higher fatty acids, for example oleic acid or cocoanut oil fatty acid and aniline or cyclohexylamine, are subjected to the new reaction.

Especially valuable, however, as parent materials are carboxylic acid amides which have at the same time a more or less strongly pronounced dyestuff character, especially dyestuffs which are sparingly soluble or insoluble. These dyestuffs may belong to various series, for example the azo-dyestuff series or the vat dyestuff series, for instance the anthraquinone series. They may, however, belong to other series, for example those of the nitro-, azine- or thiazine dyestuffs. Such dyestuffs may be also metallic compounds; thus as compounds which contain no hydroxyl groups there may also be considered compounds which contain masked hydroxyl groups, as is the case, for example, in the chromium compounds of the mordant dyestuffs. Among such dyestuffs those are of especial value which are of such a composition that they or their soluble derivatives have an affinity for vegetable fibers.

The condensation products obtainable from parent materials having dyestuff characteristics and capable of reversion by action of a saponifying agent, for instance an alkali, to the sparingly soluble dyestuff may be used, for example, for producing fast dyeings by the process of U. S. Patent No. 2,095,600. If the acyl residue which lends solubility is sufficiently stable towards saponifying agents, insoluble dyestuffs may be converted into those which may be used by the methods usual for dyeing with water-soluble dyestuffs.

The new process consists therefore in causing acylating agents containing besides the group effecting the acylation at least one group which reacts with the tertiary amine with formation of salts, to act in the presence of a tertiary base on the above defined amides which are free from hydroxyl groups. The products thus obtained are therefore again acid amide-like derivatives of the general formula

in which formula $x$ represents one of the two atomic groupings

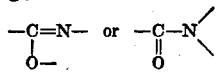

$R_1$ being then united to the carbon atom, $R_2$ to the nitrogen atom and $R_3$ to the remaining valency, and in which $R_1$ stands for the organic radical representing the carboxylic acid radical of the parent amide, N—$R_2$ stands for the divalent radical of an amine and $R_3$ represents an acyl radical containing at least one salt forming group selected from the group consisting of carboxyl groups, sulfonic groups and quaternary ammonium groups. They may be used for improving or dyeing various materials, for example vegetable and animal fibers, such as wool, silk, leather or artificial fibers, for instance fibers from regenerated cellulose or cellulose derivatives, and natural or artificial masses.

A preferred method of working of the new process consists in treating amides, said amides being dyestuffs of the azo or anthraquinone series which contain neither hydroxyl groups nor carboxyl groups or sulfonic groups, in the presence of pyridine with halides of mono-nuclear aromatic acids which contain simultaneously one carboxyl group besides one or two sulfonic groups. The products thus obtained are therefore also acid amide-like derivatives of the general formula

in which $R_1$ stands for the organic radical representing the carboxylic acid radical of the parent amide, the

grouping, which is contained in the symbol $x$—$R_2$, stands for the divalent radical of an amine, said amine being an amino-azo dyestuff or an aminoanthraquinone dyestuff, whilst $R_3$ stands for an acyl radical containing at least one sulfonic group, which products are water-soluble powders which, when treated with mild saponifying agents, regenerate the parent carboxylic acid amide, said carboxylic acid amide being also an azo-dyestuff or an anthraquinone dyestuff free from hydroxyl groups, carboxyl groups and sulfonic groups.

The following examples illustrate the invention without however limiting the same, the parts being by weight:

Example 1

3 parts of stearoylmethylamide, 4.4 parts of benzoic acid 3-sulfochloride and 30 parts of pyridine are heated together for one hour at 80–90° C. until a sample dissolves clearly in water. After removal of nearly all the pyridine in a vacuum, the bright liquid residue is taken up with 400 parts of water and then neutralized with dilute sodium carbonate solution, and the product of reaction is salted out with sodium chloride. It is filtered and dried. The nearly white product obtained in this manner in solid form dissolves in water to a colorless clear solution with formation of a strong foam. It corresponds in the free state probably to the formulae

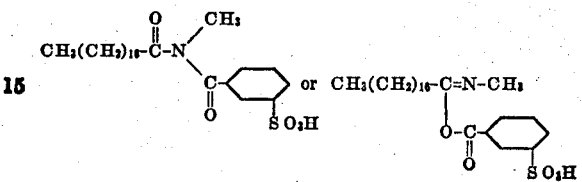

By mixing the solution with aqueous alkali the product is split with separation of the insoluble parent material.

A like product is obtained by substituting lauroyl anilide or the lauroylcyclohexylamide for the stearoylmethylamide.

In like manner benzoic acid ethylamide may be converted into a soluble derivative.

Finally, there may be substituted for the benzoic acid metasulfochloride another acylating agent of the kind hereinbefore defined, for instance sulfosalicylic acid chloride, benzoic acid-3:5-disulfochloride, sulfochloracetic acid chloride, 1:3:6-naphthalene-trisulfochloride, benzene hexacarboxylic acid chloride, naphthoic acid disulfochloride, furane-$\alpha$:$\alpha'$-sulfocarboxylic acid chloride and the like.

Example 2

1.65 parts of benzoylaminoazotoluene, 2.3 parts of benzoic acid 3:5-disulfochloride and 30 parts of pyridine are heated together for 3 hours at 110–115° C., whereby the insoluble parent material becomes soluble in water. The pyridine is distilled as far as possible in a vacuum. The residue is taken up with 100 parts of methyl alcohol, the solution is filtered from a little insoluble substance and the filtrate is evaporated. There is thus obtained a dark viscid product corresponding in the free state, probably to one of the two formulas

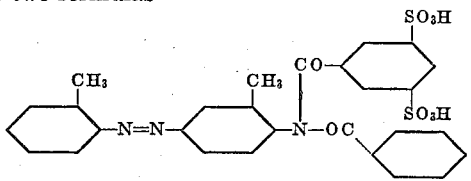

and

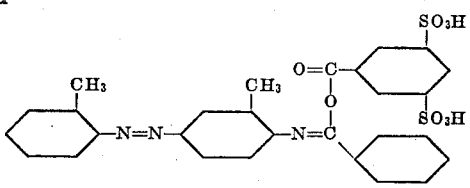

which dissolves clearly in cold water. When the aqueous solution is heated and dilute sodium carbonate solution is added thereto there is a rapid decomposition, the decomposition product proving to be benzoylaminoazotoluene (melting point 178° C.).

Similar properties are possessed by the condensation products which are obtained with the aid of further acylation by the agents prescribed in Example 2.

Instead of pyridine there may be used wholly or in part another tertiary amine, for instance dimethylaniline or tripropylamine.

Example 3

13.3 parts of 2-acetylaminoanthraquinone are stirred with 100 parts of pyridine. Into the mixture are strewn 24 parts of benzoic acid metadisulfochloride and the temperature is allowed to rise to about 80° C. As soon as a sample of the condensation mixture dissolves in water the pyridine is distilled in a vacuum at as low a temperature as possible.

The solid residue which corresponds probably to the formula

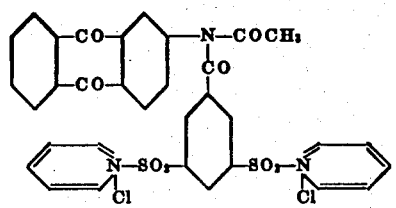

or

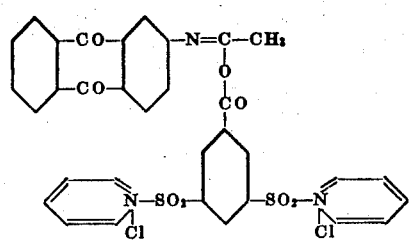

dissolves in water. By addition of alkali the parent pigment can be precipitated from the solution.

A product with similar properties is obtained by using equimolecular quantities of 1- or 2-benzoylaminoanthraquinone or of the condensation product from 1 mol of aminoanthraquinone, 2 mols of aniline and 1 mol of cyanuric chloride instead of 2-acetylaminoanthraquinone.

Example 4

6 parts of the condensation product from 1 mol cyanuric chloride with 2 mols 2-aminoanthraquinone and 1 mol aniline are heated for 3 hours at 100–110° C. with 9.6 parts of parachloromethylbenzoyl chloride in 60 parts of pyridine after which time a sample of the mass dissolves clearly in water. The pyridine is then distilled in a vacuum and the product of the reaction isolated by the procedure described in Example 6. It dissolves in water to a yellow solution from which the insoluble parent pigment is precipitated on addition of dilute alkali.

The procedure is similar with the parent materials of the preceding examples, for instance by using in this reaction stearoylmethylamide there is obtained a product of the probable formula

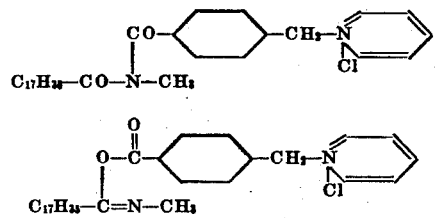

which constitutes a cation active textile assistant which in the form of a salt of a strong acid dissolves to a strongly foaming solution. The solutions are saponified easily by heating them with a saponifying agent, the stearoylmethylamide being split off. If this reaction is applied to the parent materials resembling dyestuffs used in Examples 2–3, there are obtained products which in the form of their salts are soluble in water.

What we claim is:

1. The acid amide-like derivatives corresponding to the general formula

in which formula $x$ stands for one of the two atomic groupings

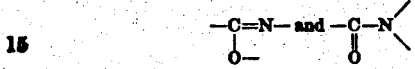

$R_1$ being united to the carbon atom, $R_2$ to the nitrogen atom and $R_3$ to the remaining valency, and in which formula $R_1$ stands for the organic radical of the carboxylic acid residue of the parent amide,

stands for the divalent radical of an amine, said amine being an amino-dyestuff, and $R_3$ stands for an acyl residue containing at least one salt forming group in the form of a salt selected from the group consisting of carboxyl groups, sulfonic groups and quaternary ammonium groups, which products are water-soluble powders which, when treated with mild saponifying agents, regenerate the parent acid amide free from hydroxyl, sulfonic and carboxyl groups corresponding to the atom grouping $R_1$—$x$—$R_2$.

2. The acid amide-like derivatives corresponding to the general formula

in which formula $x$ stands for one of the two atomic groupings

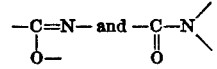

$R_1$ being united to the carbon atom, $R_2$ to the nitrogen atom and $R_3$ to the remaining valency, and in which formula $R_1$ stands for the organic radical of the carboxylic acid residue of the parent amide,

stands for the divalent radical of an amine, said amine being an amino-dyestuff, and $R_3$ stands for an acyl residue containing at least one sulfonic acid group in the form of a salt, which products are water-soluble powders which, when treated with mild saponifying agents, regenerate the parent acid amide, said amide being the dyestuff free from hydroxyl, sulfonic and carboxyl groups corresponding to the atom grouping $R_1$—$x$—$R_2$.

3. The acid amide-like derivatives corresponding to the general formula

in which formula $x$ stands for one of the two atomic groupings

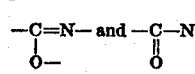

$R_1$ being united to the carbon atom, $R_2$ to the nitrogen atom and $R_3$ to the remaining valency, and in which formula $R_1$ stands for the organic radical of the carboxylic acid residue of the parent amide,

stands for the divalent radical of an amine, said amine being an amino-dyestuff, and $R_3$ stands for a mononuclear aroyl residue containing at least one sulfonic acid group in the form of a salt, which products are water-soluble powders which, when treated with mild saponifying agents, regenerate the parent acid amide, said amide being the dyestuff free from hydroxyl, sulfonic and carboxyl groups corresponding to the atom grouping $R_1$—$x$—$R_2$.

4. The acid amide-like derivatives corresponding to the general formula

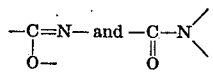

in which formula $x$ stands for one of the two atomic groupings

$R_1$ being united to the carbon atom, $R_2$ to the nitrogen atom and $R_3$ to the remaining valency, and in which formula $R_1$ stands for the organic radical of the carboxylic acid residue of the parent amide,

stands for the divalent radical of an amine, said amine being an amino-azo-dyestuff, and $R_3$ stands for a mononuclear aroyl residue containing at least one sulfonic acid group in the form of a salt, which products are water-soluble powders which, when treated with mild saponifying agents, regenerate the parent acid amide, said amide being the dyestuff free from hydroxyl, sulfonic and carboxyl groups corresponding to the atom grouping $R_1$—$x$—$R_2$.

5. The acid amide-like derivatives corresponding to the general formula

in which formula $x$ stands for one of the two atomic groupings

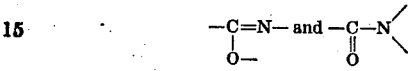

$R_1$ being united to the carbon atom, $R_2$ to the nitrogen atom and $R_3$ to the remaining valency, and in which formula $R_1$ stands for the organic radical of the carboxylic acid residue of the parent amide,

stands for the divalent radical of an amine, said amine being an amino-anthraquinone-dyestuff, and $R_3$ stands for a mononuclear aroyl residue containing at least one sulfonic acid group in the form of a salt, which products are water-soluble powders which, when treated with mild saponifying agents, regenerate the parent acid amide, said amide being the dyestuff free from hydroxyl, sulfonic and carboxyl groups corresponding to the atom grouping $R_1$—$x$—$R_2$.

CHARLES GRAENACHER.
FRANZ ACKERMANN.
HEINRICH BRUENGGER.